United States Patent
Ceccherelli et al.

(10) Patent No.: US 10,140,877 B2
(45) Date of Patent: Nov. 27, 2018

(54) COLLISION AVOIDANCE SYSTEMS

(71) Applicant: LOCKHEED MARTIN CORPORATION, Bethesda, MD (US)

(72) Inventors: John C. Ceccherelli, Owego, NY (US); James E. Bishop, Newark Valley, NY (US); Kathryn P. Guy, Binghamton, NY (US); Patrick S. Ryan, Endicott, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 15/337,969

(22) Filed: Oct. 28, 2016

(65) Prior Publication Data

US 2018/0122249 A1 May 3, 2018

(51) Int. Cl.
| | |
|---|---|
| G08G 5/04 | (2006.01) |
| B64C 39/02 | (2006.01) |
| G08G 5/00 | (2006.01) |
| G01S 1/04 | (2006.01) |
| H04W 84/06 | (2009.01) |

(52) U.S. Cl.
CPC .......... G08G 5/04 (2013.01); B64C 39/024 (2013.01); G01S 1/042 (2013.01); G08G 5/0008 (2013.01); G08G 5/0021 (2013.01); G08G 5/0056 (2013.01); G08G 5/0069 (2013.01); G08G 5/045 (2013.01); H04W 84/06 (2013.01)

(58) Field of Classification Search
CPC .. G08G 5/0047; G08G 5/0008; G08G 5/0013; G08G 5/0021; G08G 5/0056; G08G 5/04; G08C 17/02; G01S 19/48; G01S 19/17; G01S 1/042; B64C 39/024
USPC .... 340/961, 870.11, 870.09; 701/3, 467, 14, 701/120; 342/27, 457, 386, 30, 385
See application file for complete search history.

(56) References Cited

U.S. PATENT DOCUMENTS

| | | | | |
|---|---|---|---|---|
| 5,367,306 A | * | 11/1994 | Hollon | G01S 1/68 342/357.31 |
| 5,515,061 A | * | 5/1996 | Hiltz | G01S 1/68 342/385 |
| 8,498,803 B2 | * | 7/2013 | Blomenhofer | G08G 5/0013 701/120 |
| 8,554,264 B1 | * | 10/2013 | Gibbons | H04H 20/71 455/127.1 |
| 9,613,521 B2 | * | 4/2017 | Hunter | G08B 25/016 |
| 9,654,200 B2 | * | 5/2017 | Mazzarella | H04B 7/18504 |
| 2003/0089219 A1 | * | 5/2003 | Gorman | F41H 11/02 89/1.11 |
| 2009/0040108 A1 | * | 2/2009 | Katz | G01S 19/48 342/386 |
| 2009/0315777 A1 | * | 12/2009 | Baughman | G01S 5/04 342/457 |
| 2010/0085236 A1 | * | 4/2010 | Franceschini | G01S 13/765 342/30 |

(Continued)

*Primary Examiner* — Hoi Lau
(74) *Attorney, Agent, or Firm* — Kent Kemeny; Andrew M. Calderon; Roberts Mlotkowski Safran Cole & Calderon, P.C.

(57) ABSTRACT

The disclosure is directed to systems and methods for collision avoidance of aerial vehicles. More particularly, the disclosure is directed to systems and methods for avoiding collisions between manned aerial vehicles and unmanned aerial vehicles. The unmanned aerial vehicle includes a low power RF beacon which transmits signals over a predefined frequency monitored by manned aerial vehicles.

19 Claims, 2 Drawing Sheets

(56) References Cited

U.S. PATENT DOCUMENTS

| | | | | |
|---|---|---|---|---|
| 2010/0182969 A1* | 7/2010 | Hirsch | G06Q 10/00 | 370/329 |
| 2011/0049288 A1* | 3/2011 | Suzuki | B64C 37/02 | 244/2 |
| 2011/0246002 A1* | 10/2011 | Shavit | G08G 5/0026 | 701/14 |
| 2012/0143406 A1* | 6/2012 | O'Connor | G01C 21/00 | 701/3 |
| 2012/0261144 A1* | 10/2012 | Vian | G06Q 10/06315 | 169/43 |
| 2013/0140649 A1* | 6/2013 | Rogers | H01L 29/66 | 257/414 |
| 2013/0317669 A1* | 11/2013 | Jiang | G01S 3/80 | 701/3 |
| 2014/0139366 A1* | 5/2014 | Moses | G01S 13/9303 | 342/27 |
| 2015/0022373 A1* | 1/2015 | Bommer | G08C 17/02 | 340/870.11 |
| 2015/0260824 A1* | 9/2015 | Malveaux | G08G 5/0008 | 340/870.09 |
| 2015/0365159 A1* | 12/2015 | Bosworth | G08G 5/0069 | 455/11.1 |
| 2016/0012731 A1* | 1/2016 | Limbaugh | G08G 5/0069 | 701/120 |
| 2016/0071421 A1* | 3/2016 | Bousquet | G08G 5/0047 | 701/467 |
| 2016/0156409 A1* | 6/2016 | Chang | H04B 7/2041 | 370/315 |
| 2016/0196750 A1* | 7/2016 | Collins | B64C 39/024 | 701/14 |
| 2016/0351057 A1* | 12/2016 | Elmasry | G05D 1/0022 | |
| 2017/0025023 A1* | 1/2017 | Goddemeier | G08G 5/0013 | |
| 2017/0254622 A1* | 9/2017 | Evans | F41G 7/2206 | |
| 2018/0026705 A1* | 1/2018 | Parks | G08C 17/02 | 701/2 |
| 2018/0122249 A1* | 5/2018 | Ceccherelli | G08G 5/04 | |

* cited by examiner

COLLISION AVOIDANCE SYSTEMS

FIELD OF THE INVENTION

The invention is directed to systems and methods for collision avoidance of aerial vehicles. More particularly, the invention is directed to systems and methods for avoiding collisions between manned aerial vehicles and unmanned aerial vehicles.

BACKGROUND DESCRIPTION

The use of unmanned aerial vehicles is becoming more prevalent as technology advances. These unmanned aerial vehicles can come in many different shapes, sizes and configurations. For example, the unmanned aerial vehicles can be drones, helicopters, airplanes, etc. The unmanned aerial vehicles in the vicinity of manned aircraft, especially during training exercises, can become hazardous to the manned aircraft. In fact, there have been many documented near collisions, e.g., close calls, between manned and unmanned aerial vehicles.

Current systems to avoid collisions between manned and unmanned aerial vehicles are either expensive or not adequate. For example, although video processing technology is advancing rapidly to give unmanned aerial vehicles obstacle avoidance technology, these systems are expensive and require extra processing (SWaP issues). Visual markings on unmanned aerial vehicles, e.g., paint schemes, and high intensity strobe lights, on the hand, can be inexpensive and helpful in certain situations. The use of the visual markings, though, may not be effective due to the speed and size of the unmanned aerial vehicles, e.g., as it makes it difficult to identify the unmanned aerial vehicles.

SUMMARY OF THE INVENTION

In an aspect of the invention, an unmanned aerial vehicle comprises a low power RF beacon which transmits signals over a predefined frequency monitored by manned aerial vehicles.

In an aspect of the invention, a system comprises an unmanned aerial vehicle and a RF beacon mounted to the unmanned aerial vehicle. The RF beacon comprises a power level of about 10 mW, transmits signals capable of breaking a squelch of a communication system of a manned aerial vehicle, and remains in a transmitting mode during flight operations.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to systems and methods for collision avoidance of aerial vehicles. More particularly, the invention is directed to systems and methods for avoiding collisions between manned aerial vehicles and unmanned aerial vehicles. The unmanned aerial vehicles can be, for example, helicopters, airplanes, balloons and other types of drones; whereas, the manned aerial vehicles can be any type of helicopter, airplane, etc.

In embodiments, the systems and methods described herein comprise a radio frequency (RF) beacon mounted to an unmanned aerial vehicle. The RF beacon is set on a very low power setting, which can transmit audio on training and emergency frequencies such that the proximity of the unmanned aerial vehicle to the manned aerial vehicle would break squelch on the manned aerial vehicle. In embodiments, the RF beacon can transmit a simple alert audio or text message, e.g., with altitude and/or location information.

As a result of implementing the systems and methods described herein, manned aerial vehicles can be notified of the proximity to an unmanned aerial vehicle so that evasive maneuvers can be taken, if needed, to avoid collision. In addition, advantageously, the systems and methods described herein provide:

(i) A low cost avoidance collision system;
(ii) A small, low power antenna which is modular and easy to install on an unmanned aerial vehicle;
(iii) A system which does not require any modification or specialized radios or equipment on a manned aerial vehicle; and
(iv) A system that can be generically used for both military and civilian manned/unmanned avoidance.

SYSTEM IMPLEMENTATIONS

Figure 1:
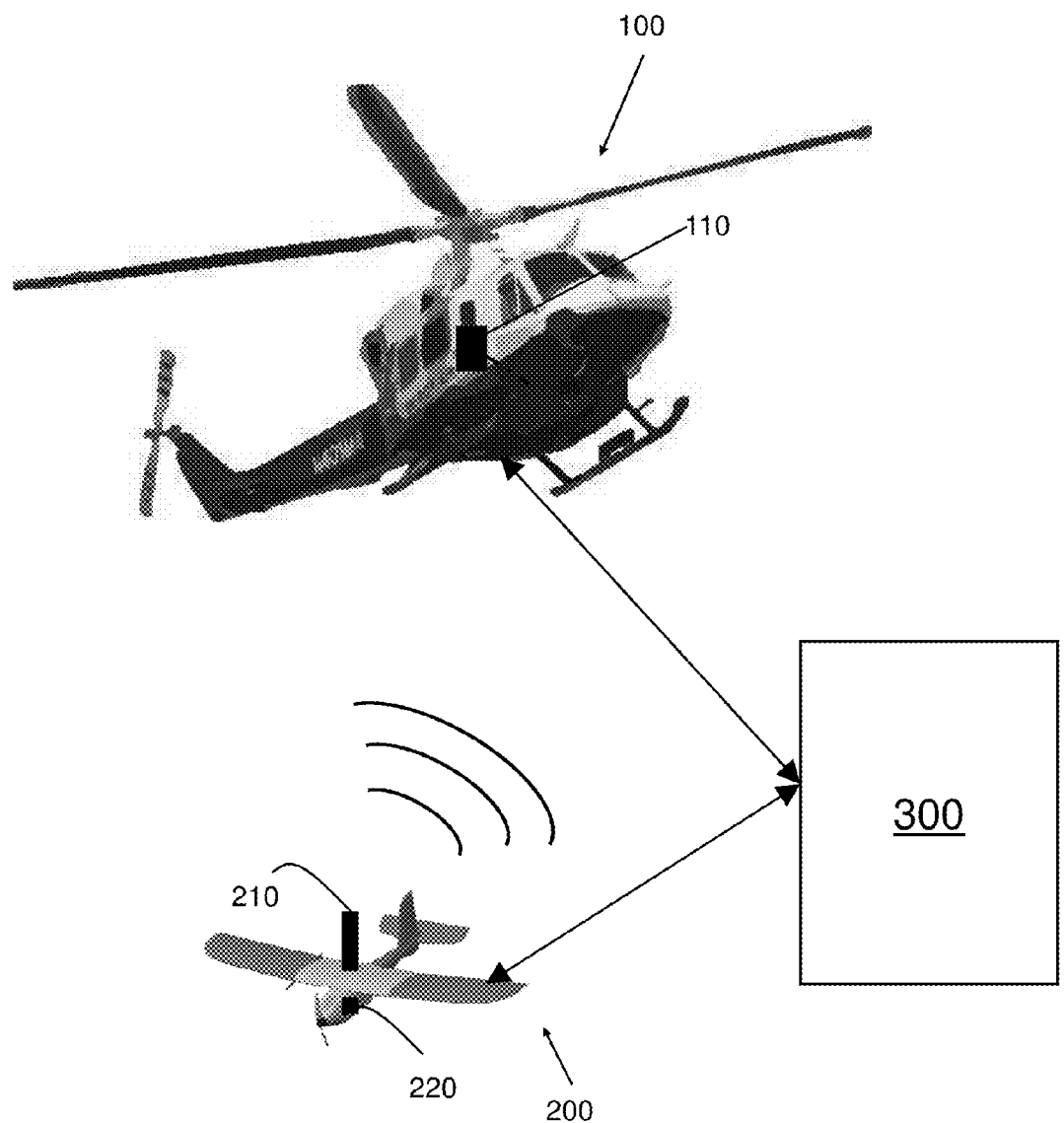
FIG. 1 shows a schematic of a manned aerial vehicle and unmanned aerial vehicle with collision avoidance detection systems in accordance with aspects of the invention.

FIG. 1 shows a schematic of a manned aerial vehicle and unmanned aerial vehicle with collision avoidance detection systems in accordance with aspects of the invention. More specifically, FIG. 1 shows both a manned aerial vehicle 100 and an unmanned aerial vehicle 200. In embodiments, the manned aerial vehicle 100 can be, e.g., any manned aerial vehicle for use military or commercial applications. The manned aerial vehicle 100 can be, for example, an airplane, helicopter, etc.; whereas, the unmanned aerial vehicle 200 can be, for example, an airplane, helicopter, balloon, drone, etc.

In embodiments, the manned aerial vehicle 100 includes a communication system 110 (e.g., radio or other receiving device) and the unmanned aerial vehicle 200 includes an RF beacon 210. As should be understood by those of skill in the art, the communication system 110 is an electronic device that can receive a radio-frequency signal, e.g., audio or text, from the RF beacon 210. In this way, the manned aerial vehicle 100 can receive a transmission from the unmanned aerial vehicle 200 to alert the pilot of the manned aerial vehicle 100 of the proximity and, hence, a risk of colliding with the unmanned aerial vehicle 200. Accordingly, for example, upon receiving the transmission from the RF beacon 210, the pilot of the manned aerial vehicle 100 can (i) assess the distance from the unmanned aerial vehicle 200 and (ii) take evasive maneuvers to avoid a collision with the unmanned aerial vehicle 200.

In embodiments, the RF beacon 210 is mounted on or within the unmanned aerial vehicle 200 and can be set to a very low power settings, e.g., about 10 mW; although other power settings are also contemplated by the present invention. The RF beacon 210 can be a small form factor radio, with lower power, ensuring SWaP (size, weight, power) compliance to Group 1 unmanned aerial vehicles. The RF beacon 210 is preferably only a transmitting beacon which is always in the "ON" mode when the unmanned aerial vehicle 200 is in flight, transmitting audio signals at a certain frequency. In embodiments, the RF beacon 210 can transmit audio on training and/or emergency frequencies such that a pilot of the manned aerial vehicle 100, upon hearing the audio, can take evasive maneuvers (e.g., climb above the operating limits of the unmanned aerial vehicle 200) to avoid collision.

In embodiments, the training and/or emergency frequencies can be any standard emergency and/or civilian (or military) guard frequencies, depending on the particular application. For example, as one of skill in the art would understand, aircraft emergency frequency (also known as guard) is a frequency used on the aircraft band reserved for emergency communications for aircraft in distress. The frequencies can be, e.g., 121.5 MHz for civilian, also known as International Air Distress (IAD) or VHF Guard, and 243.0 MHz for military use, also known as Military Air Distress (MAD) or UHF Guard. It should be understood that other frequencies are also contemplated herein, e.g., 406 MHz used by modern Emergency Locator Transmitters (ELTs).

Advantageously, by using standard emergency and guard frequencies, there is no need to make any modifications to the communication equipment 110 of the manned aerial vehicle 100 as such equipment is already designed to monitor these frequencies. That is, 243 MHz is the emergency voice frequency which all military radios, e.g., communication system 110, monitor, and 121.5 MHz is the civilian guard frequency which is monitored by all civilian aircraft.

In embodiments, the RF beacon 210 can transmit a tone to alert the pilot of the manned aerial vehicle of its proximity to the unmanned aerial vehicle 200. In additional or alternative embodiments, the RF beacon 210 can send text or audio based messages, e.g., "UAV". In further improvements to the message, the RF beacon 210 can send text or audio based messages such as altitude information (UAV @ 1100 ft AGL) and/or position information (UAV @ lat/long) or other pertinent information concerning location and/or collision avoidance information. In embodiments, it is also possible to interleave messages, e.g., "UAV, UAV, UAV @ 1100 ft AGL, UAV, UAV. It should be understood that other messages are contemplated herein, and that the above example is only an illustrative non-limiting example. In embodiments, the unmanned aerial vehicle 200 may include a GPS system and altimeter, as represented by reference numeral 220, in order to provide/determine the position and altitude, respectively, of the unmanned aerial vehicle 200.

In embodiments, the RF beacon 210 can provide a signal which can break through the squelch function of the communication equipment 110 of the manned aerial vehicle 100. In telecommunications, squelch is a circuit function that acts to suppress the audio output of a receiver in the absence of a sufficiently strong desired input signal. Squelch is widely used in two-way radios and radio scanners to suppress the sound of channel noise when the radio is not receiving a transmission; however, the squelch function can be overcome by the transmitting signal of the RF beacon 210, thus warning the pilot of the manned aerial vehicle 100 of possible collision with the unmanned aerial vehicle 200. Accordingly, as the squelch is already set on the manned aerial vehicle 100, it would not be necessary to make any modifications to the communication equipment 110 of the manned aerial vehicle 100.

In embodiments, the RF beacon 210 can also transmit its information (if in range) to ground based systems 300. The ground based systems 300 can include air traffic control with radar and telecommunication systems (represented at reference numeral 300). The operator of the ground based systems 300 can then initiate communication with the manned aerial vehicle 100 to ensure that the pilot of the manned aerial vehicle 100 is aware of the location and/or altitude and/or distance to the unmanned aerial vehicle 200, thus ensuring that the manned aerial vehicle 100 stays at a safe distance from the unmanned aerial vehicle 200. In this way, the ground based systems 300 can act as an intermediary between the manned aerial vehicle 100 and the unmanned aerial vehicle 200, which is particularly beneficial when the unmanned aerial vehicle 200 is out of radio range of the manned aerial vehicle 100.

SYSTEM ENVIRONMENT

Figure 2:
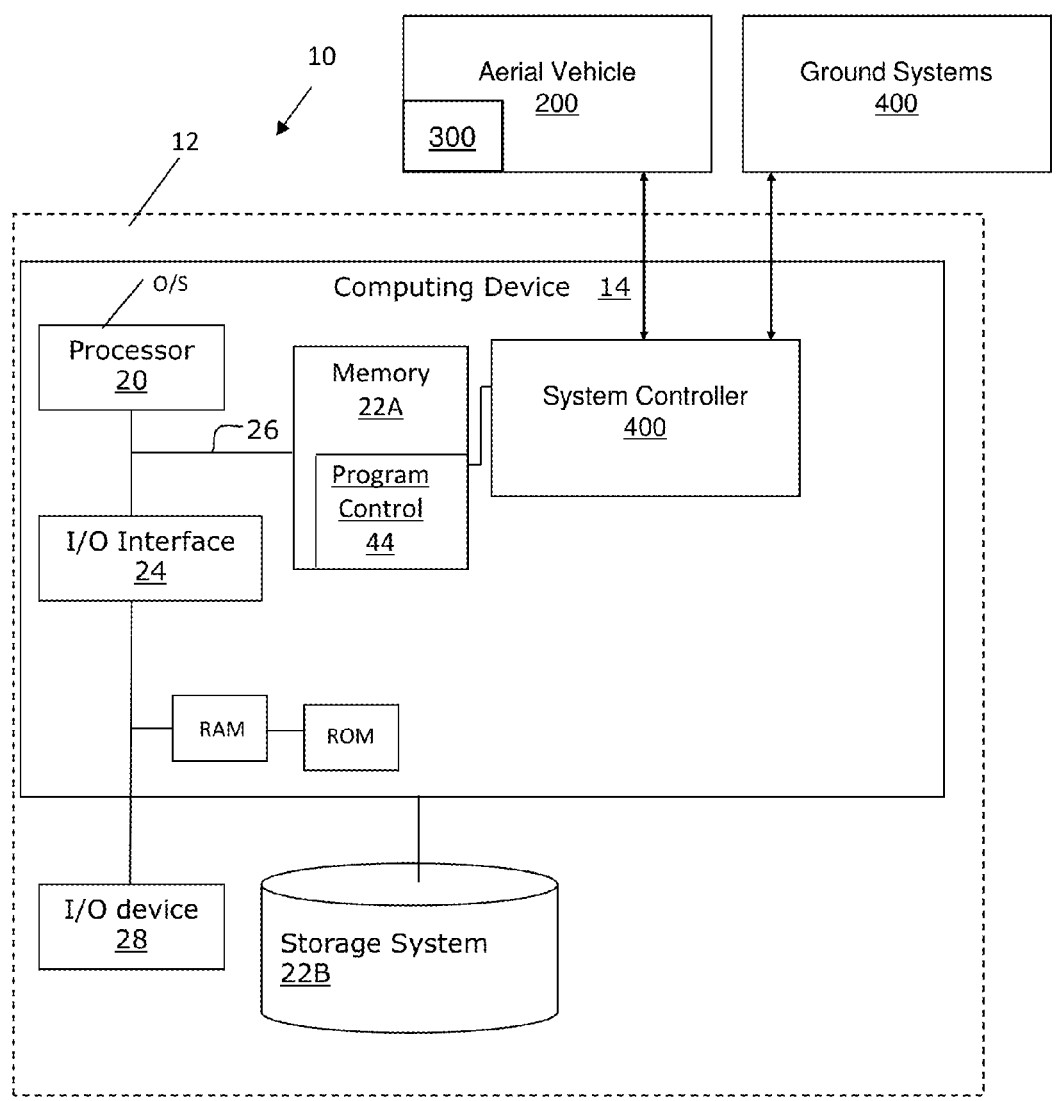
FIG. 2 shows an illustrative environment for implementing the steps in accordance with aspects of the invention.

FIG. 2 shows an illustrative environment 10 for managing the processes in accordance with the invention. The environment 10 includes a server or other computing system 12 that can perform the processes described herein. In embodiments, the illustrative environment may be used in the manned aerial vehicle 100 as shown illustratively in FIG. 1. The computing system 12 can be representative of the communication system 110 of the manned aerial vehicle 100, as well as the ground based systems 300.

The computing system 12 includes a computing device 14 which can be resident on or communicate with a network infrastructure or other computing devices. The computing system 12 can communicate with the manned aerial vehicle 100, the manned aerial vehicle 200 and the ground based systems 300. The computing device 14 includes a processor 20, memory 22A, an I/O interface 24, and a bus 26. In addition, the computing device includes random access memory (RAM), a read-only memory (ROM), and an operating system (O/S). The computing device 14 is in communication with an external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link or any device that enables the computing device 14 to interact with is environment.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code 44 executes the processes of the invention such as, for example, receiving signals from the unmanned aerial vehicle 200 and, for example, alerting the pilot of the manned aerial vehicle 100 that any unmanned aerial vehicle 200 is in close proximity to the manned aerial vehicle 100.

The computing device 14 includes the system controller 400, which can be implemented as one or more program code in the program code 44 stored in memory 22A as a separate or combined module. Additionally, the system controller 400 may be implemented as separate dedicated processors or a single or several processors to provide the functionality of this tool. Moreover, it should be understood by those of ordinary skill in the art that the system controller 400 is used as a general descriptive term for providing the features and/or functions of the present invention, and that the system controller 400 may comprise many different components such as, for example, the components and/or infrastructure described and shown with reference to FIG. 1.

In embodiments, the program code 44 and more specifically the system controller 400 communicates with ground based systems 400 such as, for example, air traffic controllers, or the unmanned aerial vehicle 200.

The present invention may be embodied as a system, method or computer program product. The present invention may take the form of a hardware embodiment, a software embodiment or a combination of software and hardware. Furthermore, the present invention may take the form of a computer program product embodied in any tangible storage having computer-usable program code embodied in the medium (non-transitory medium). The computer-usable or computer-readable medium may be medium that can contain or store information for use by or in connection with the instruction execution system, apparatus, or device. The computer-usable or computer-readable medium may be, for example, an electronic, magnetic, optical, electromagnetic, infrared, or semiconductor system, apparatus, or device. More specific examples of the computer readable storage medium, memory or device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium, memory or device, or computer-usable or computer-readable medium, as used herein, is not to be construed as being transitory signals per se.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. An unmanned aerial vehicle comprising a RF beacon which transmits audio signals over a predefined frequency monitored by manned aerial vehicles, wherein the RF beacon transmits at a frequency that break squelch on communication equipment of the manned aerial vehicle.

2. The unmanned aerial vehicle of claim 1, wherein the RF beacon has a power of about 10 mW.

3. The unmanned aerial vehicle of claim 1, wherein the RF beacon always transmits when the unmanned aerial vehicle is in flight.

4. The unmanned aerial vehicle of claim 3, wherein the RF beacon transmits in emergency and/or guard frequencies.

5. The unmanned aerial vehicle of claim 4, wherein the RF beacon transmits at a frequency of 121.5 MHz.

6. The unmanned aerial vehicle of claim 4, wherein the RF beacon transmits at a frequency of 243.0 MHz.

7. The unmanned aerial vehicle of claim 4, wherein the RF beacon transmits at a frequency of 406 MHz.

8. The unmanned aerial vehicle of claim 3, wherein the RF beacon transmits a tone to alert the pilot of the manned aerial vehicle of its proximity to the unmanned aerial vehicle.

9. The unmanned aerial vehicle of claim 3, wherein the RF beacon transmits a text based message or an audio based message.

10. The unmanned aerial vehicle of claim 3, wherein the RF beacon transmits at least one of altitude and position information of the unmanned aerial vehicle.

11. The unmanned aerial vehicle of claim 10, wherein the unmanned aerial vehicle includes at least one of a GPS and altimeter.

12. A system comprising:
an unmanned aerial vehicle; and
a RF beacon mounted to the unmanned aerial vehicle,
wherein the RF beacon
comprises a power level of about 10 mW,
transmits audio signals capable of breaking a squelch of a communication system of a manned aerial vehicle, and
always remains in a transmitting mode during flight operations of the unmanned aerial vehicle.

13. The system of claim 12, wherein the RF beacon transmits the audio signals over a frequency monitored by manned aerial vehicles in emergency and guard frequency.

14. The system of claim 12, wherein the RF beacon transmits the audio signals over a range of about 121.5 MHz to 406 MHz.

15. The system of claim 12, wherein the RF beacon transmits text based messages.

16. The system of claim 12, wherein the RF beacon transmits at least one of altitude and position information of the unmanned aerial vehicle.

17. The system of claim 16, wherein the unmanned aerial vehicle includes at least one of a GPS and altimeter.

18. The unmanned aerial vehicle of claim 1, wherein the audio signals comprise a tone or audio message indicating presence of the unmanned aerial vehicle interleaved with altitude information or position information of the unmanned aerial vehicle.

19. The unmanned aerial vehicle of claim 18, wherein the audio signals further comprise collision avoidance information.

* * * * *